United States Patent [19]

Berliner

[11] Patent Number: 5,940,613
[45] Date of Patent: Aug. 17, 1999

[54] METHOD FOR CREATING A SINGLE BINARY VIRTUAL DEVICE DRIVER FOR A WINDOWING OPERATING SYSTEM

[75] Inventor: Brian Berliner, Colorado Springs, Colo.

[73] Assignee: Sun Microsystems, Inc., Palo Alto, Calif.

[21] Appl. No.: 08/640,670

[22] Filed: May 1, 1996

[51] Int. Cl.$^6$ .................................................. G06F 9/40
[52] U.S. Cl. ............................................................. 395/681
[58] Field of Search .................................... 395/681, 651, 395/652, 653

[56] References Cited

U.S. PATENT DOCUMENTS

| | | | |
|---|---|---|---|
| 4,649,479 | 3/1987 | Advani et al. | 395/681 |
| 5,265,252 | 11/1993 | Rawson, III et al. | 395/681 |
| 5,459,867 | 10/1995 | Adams et al. | 395/681 |
| 5,664,195 | 9/1997 | Chatterji | 395/712 |

FOREIGN PATENT DOCUMENTS

WO 96 07136   3/1996   WIPO .

OTHER PUBLICATIONS

Brown, John Forrest, "Building VxDs In Windows 95", Dr. Dobb's Sourcebook, Mar./Apr. 1996, p. (15).
Oney, Walter, "Building Device Drivers That Conform to Windows 95 Plug and Play Standards", Microsoft Systems Journal, p. (23), Dec. 1995.
Dr. Dobbs Journal, vol. 20, No. 11, Nov. 1995, pp. 64, 66–68, Matthews, D.: "Porting VXDS From Windows 3.1 to Windows 95".

*Primary Examiner*—Alvin E. Oberley
*Assistant Examiner*—St. John Courtenay, III
*Attorney, Agent, or Firm*—William J. Kubida; Holland & Hart LLP

[57] ABSTRACT

A method for creating a virtual device driver that runs under both Windows 3.x and Windows 95 operating systems is disclosed. There are two basic obstacles to be overcome in creating a virtual device driver VxD that will operate under both Windows 95 and Windows 3.x. The first obstacle, that of identificational incompatibility, is cured by disguising a Windows 95 compatible driver as a Windows 3.x compatible driver. This is done by renaming the Windows 95 driver with a file name having the three-character extension "386". The version number within a Device Descriptor Block must also be changed in order to effect a total disguise. Once the identificational incompatibility has been cured through the aforementioned steps, Windows 3.x will load the Windows 95 driver. The second obstacle, that of partial functional incompatibility, is cured by appending additional logic and supplementary Windows 3.x emulation routines to the Windows 95 driver. The logic works in the following manner: Whenever a Windows 3.x operating system call is made to the driver, the standard Windows 95 driver interface is granted control whenever that interface is compatible with Windows 3.x. However, whenever direct control by the standard Windows 95 driver interface is incompatible with Windows 3.x, the Windows 3.x driver interface is emulated by the supplementary routines.

3 Claims, 3 Drawing Sheets

METHOD FOR CREATING A SINGLE BINARY VIRTUAL DEVICE DRIVER FOR A WINDOWING OPERATING SYSTEM

This application is related to U.S. application Ser. No. 08/641,654 entitled METHOD FOR IMPLEMENTING A NON-VOLATILE CACHING PRODUCT FOR NETWORKS AND CD-ROMS filed May 1, 1996 (Sun patent docket No. P1503); to U.S. application Ser. No. 08/641,653 entitled MULTI-TIER CACHE SYSTEM AND METHOD FOR IMPLEMENTING SUCH A SYSTEM filed on May 1, 1996 (Sun patent docket No. P1504); to U.S. application Ser. No. 08/640,527 entitled METHOD FOR NON-VOLATILE CACHING OF NETWORK AND CD-ROM FILE ACCESSES USING A CACHE DIRECTORY, POINTERS, FILE NAME CONVERSION, A LOCAL HARD DISK, AND SEPARATE SMALL DATABASE (AS AMENDED) filed on May 1, 1996 (Sun patent docket No. P1505); to U.S. application Ser. No. 08/641,523 entitled METHOD FOR PURGING UNUSED DATA FROM A CACHE MEMORY FILED on May 1, 1996 (Sun patent docket No. P1506); and to U.S. application Ser. No. 08/639,531 entitled METHOD AND COMPUTER PROGRAM PRODUCT TO REUSE DIRECTORY SEARCH HANDLES (AS AMENDED) filed on May 1, 1996 (Sun patent docket No. P1507), all assigned to Sun Microsystems, Inc. assignee of the present invention, the disclosures of which are herein incorporated by this reference.

BACKGROUND OF THE INVENTION

1. Field of the Invention

This invention relates to non-volatile caching systems for data processing systems, and methods for implementing such systems.

2. Decsription of the Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

As this is written, there are roughly 150 million computers throughout the world capable of performing general business-related tasks. When the rapid proliferation of personal computers began in the early 1980s, nearly all of them were employed as stand-alone units. However, multi-user systems were soon developed. These early multi-user systems ran software written for the CP/M disk operating system, which had been written by Gary Kildall and was marketed by his company, Digital Research, Inc. The multi-user disk operating system MP/M supplied by Digital Research, Inc. connected several "dumb" terminals to a single microprocessor and a shared disk drive, while TurboDOS—a much more sophisticated product supplied by an unrelated company—utilized a master/slave arrangement much like the Local Area Networks (LANs) in use today.

Both the MP/M and the TurboDOS disk operating systems ran on computer systems based on either the Intel 8080 microprocessor or the Zilog Z-80 microprocessor. Neither of these early microprocessors could directly address more than 65,536 bytes of random-access memory. As a consequence of MP/M and TurboDOS requiring a minimum of about 50,000 bytes of random access memory, only about 15,000 bytes of addressable memory remained for application programs. As few application programs, other than simple word processors, required 15,000 bytes or less, the early multi-user systems were, for the most part, more intellectual curiosities than they were practical, general-use, multi-user data processing systems.

Distributed data processing (i.e., multiple LANs interconnected via a long-distance data link) using either MP/M or TurboDOS was also difficult, as it would have required loading a communication program into memory, in addition to the operating system, before application software could be loaded. However, with the introduction of IBM-compatible computers based on the Intel 80286 microprocessor, which was designed to address several megabytes of random-access memory, the development of practical LANs and distributed data processing systems became feasible. Although Novel Corporation initially captured a majority share of the LAN market, the number of networks utilizing LAN software from Microsoft Corp. has been growing.

Present-day LANs generally use a twisted wire pair or a coaxial cable to interconnect individual user computer systems to a server system. The interconnection of LANs is accomplished via telephone lines, special dedicated data lines, fiber optic lines, microwave, or satellite links. For acoustic links, each end of the link generally requires a modem. The other links typically utilize a "bridge" and a "router" at each end.

Distributed data processing networks and the LANs within those distributed networks can often benefit from caching. Typically, links between LANs of a distributed processing network are slower than the interconnections between the nodes (i.e., individual computers) of a LAN. Furthermore, though a distant memory resource (e.g. a disk drive on a distant server system) may be as fast or even faster than local memory resources, long distance interconnections over a data link can dramatically slow access time to that distant resource. Regardless of the type of link between the LANs of a distributed processing network, or between the nodes (i.e., individual systems) of a LAN, each data link has a given bandwidth which will permit only a finite amount of data to be simultaneously transferred over the link. Once the bandwidth is exceeded, as for example when more than a certain number of users are attempting to communicate over the same link (whether between LANs or within a LAN), response time over that link typically degrades as each user's request is delayed in order to evenly accommodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of low-cost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "6X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as Microsoft® Windows™ ver. 3.X, Microsoft Windows 95, Windows NT®, IBM Corporation's OS/2®, and Geoworks® have been developed over the years. Of the aforementioned products, only Windows NT and OS/2 are true operating systems, as Geoworks and Windows 3.x must be loaded and run under the venerable Microsoft MS-DOS operating system. Windows 95 is somewhat of a hybrid, as it also requires portions of MS-DOS for its operation. For the sake of simplicity, though, both Windows 3.X and Windows 95 are referred to hereinafter as operating systems.

As this is written, Microsoft Windows ver. 3.X is far and away the most used operating system, having been bundled with nearly every personal computer sold between 1989 and mid-1995. However, from the date of its release in 1995, the Microsoft Windows 95 operating system from Microsoft Corporation has been bundled with most new, high-performance personal computers. In less than a year, it has become the operating system of choice for most business applications, and is expected to rapidly supplant Windows 3.X as the most used operating system for personal computers. The potential exists for significantly increasing the performance of both CD-ROM drives and distributed processing networks operating under Windows 3.x and Windows 95 operating systems through caching.

SUMMARY OF THE INVENTION

Microsoft Windows 3.x and Windows 95 operating system platforms include compiled, 32-bit program components, each of which runs at Ring-0 and which is called a Virtual Device Driver or VxD, for short. Windows 95 incorporates a VxD known as the Installable File System Manager (IFSMGR). All file system input/output requests received by Windows 95 are "hooked" to the IFSMGR VxD.

Shortly after the release of Windows 95, Sun Microsystems, Inc. (hereinafter also "Sun") set about to create a network and CD-ROM caching product that runs under both Windows 3.X and Windows 95, is completely transparent to end-users, and works with a wide variety of file systems running under both Windows 3.X and Windows 95. In order to fulfill these requirements in its recently released caching product, Sun utilizes the services provided by the IFSMGR VxD and effectively "layers" its product between the IFSMGR VxD and the generic file system of Windows 95. Sun's new caching product, which also fits the definition of a virtual device driver, is named "Solstice PC-CacheFS" (hereinafter "PC-CacheFS").

A virtual device driver is typically written to achieve optimum performance with only a particular version of Windows (e.g., either 3.x or 95). Each VxD incorporates a Device Descriptor Block (DDB) which includes a version number, in addition to other descriptive information. The DDB of each device driver is read by a Windows operating system at boot-time initialization. Although, because of the need for backward compatibility, the Windows 95 operating system will load a Windows 3.x driver, the reverse is not true.

Rather than create separate caching products for Windows 3.X and Windows 95, the PC-CacheFS caching VxD has been designed so that it will run under both operating systems. This has decreased product development time and costs and will surely result in a reduction of the product support burden. One of the obstacles which had to be overcome before a cross-platform caching VxD could be developed was the absence of a IFSMGR virtual device driver within Windows 3.x. Sun's PC-CacheFS development team surmounted this obstacle by writing a Windows 3.x IFSMGR VxD from scratch using the Windows 95 IFSMGR specification provided by Microsoft Corporation as a guide. When the PC-CacheFS VxD is run under Windows 3.x, calls to the Windows 95 IFSMGR VxD are replaced by calls to the Windows 3.x IFSMGR VxD. By using this arrangement, neither the PC-CacheFS caching product nor the Windows operating systems, themselves, need be rewritten to achieve compatibility.

This invention includes a method for creating a virtual device driver that runs under both Windows 3.x and Windows 95 operating systems. Although the invention was developed in connection with the provision of a caching VxD, the process is applicable to any virtual device driver. The following steps are taken to build the driver, before it is loaded and executed on a data processing system under the Windows operating system:

(a) building the driver according to the Windows 95 interface specification to produce a driver.vxd file (a driver file having the three-character file extension required for Windows 95 driver files);

(b) copying the driver.vxd file to driver.386 (a driver file having the three-character file extension required for Windows 3.x driver files); and (c) patching the driver.386 file's Device Descriptor Block to render it compatible with the Windows 3.x operating system.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
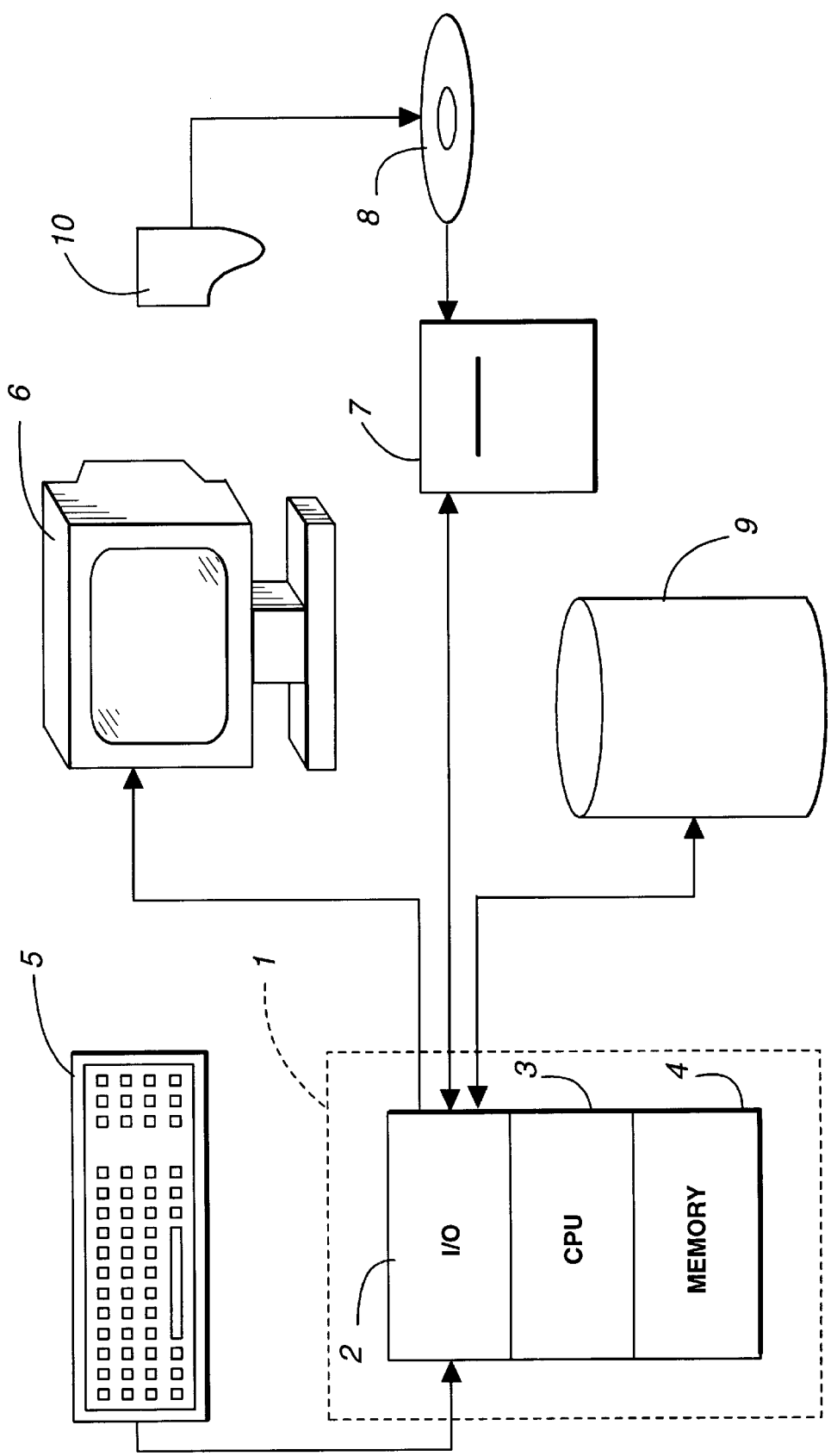
FIG. 1 illustrates a computing system for performing the computer implemented steps of the method in accordance with the invention.

The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC systems offered by Sun Microsystems, Inc., personal computers offered by IBM Corporation and by other manufacturers of IBM-compatible personal computers, and systems running the UNIX operating system.

Rather than create separate caching products for Windows 3.X and Windows 95, the PC-CacheFS caching VxD has been designed so that it will run under both operating systems. This has decreased product development time and costs and surely will likely result in a reduction of the product support burden. One of the obstacles which had to be overcome before a cross-platform caching VxD could be developed was the absence of a IFSMGR virtual device driver within Windows 3.x. This obstacle was surmounted by modifying the Windows 95 IFSMGR VxD so that it will run under Windows 3.X. The Windows 95 IFSMGR specification provided by Microsoft Corporation was utilized as a guide during the modification effort. Thus, by using a modified version of the Windows 95 IFSMGR VxD for Windows 3.x, neither the PC-CacheFS caching product nor the Windows operating systems, themselves, required rewriting to achieve compatibility.

There are two basic obstacles to be overcome in creating a virtual device driver VxD that will operate under both Windows 95 and Windows 3.x. The first obstacle is that of identificational incompatibility. The second obstacle is that of partial functional incompatibility.

The identificational incompatibility occurs for two reasons. First, a Windows 95 VxD has a file name such as "drvrname.vxd". That is to say, a name of up to eight characters followed by a period and the three-character file extension "vxd". A Windows 3.x VxD, on the other hand, has the same format, but with the three-character extension "386". The second identificational incompatibility occurs because each VxD—whether for Windows 3.x or for Windows 95—incorporates a Device Descriptor Block (DDB) which includes a version number, in addition to other descriptive information. The DDB of each device driver is read by the Windows operating system at boot-time initialization. Although, because of the need for backward compatibility, the Windows 95 operating system has been designed so that it can load and successfully execute a Windows 3.x driver, the reverse is not true.

Figure 2:
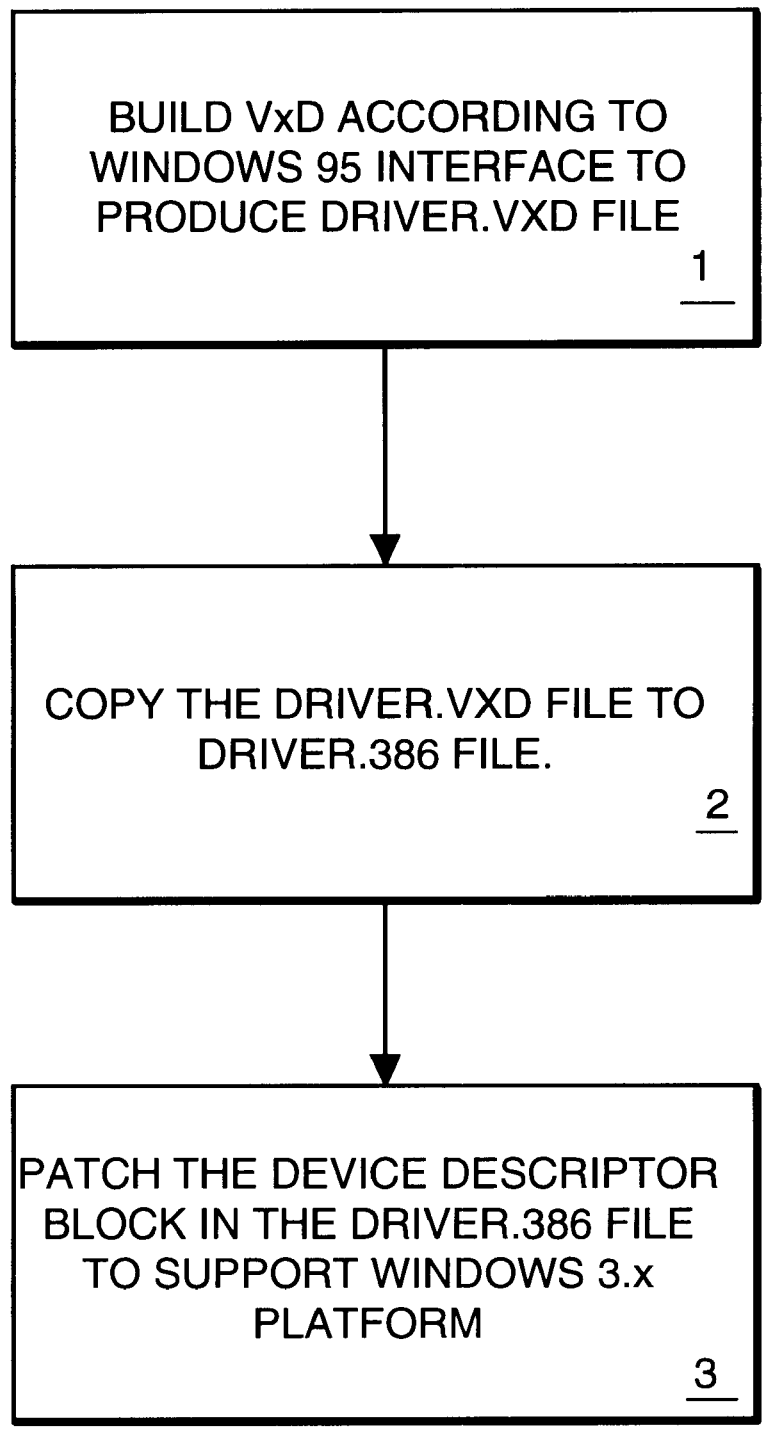
FIG. 2 is a flow chart depicting the steps required to build the cross-platform-compatible virtual device driver.

The Windows 95 operating system may be viewed as a super set of Windows 3.x. This, of course, accounts for the partial functional incompatibility of Windows 95 virtual device drivers with Windows 3.x. In order to create a virtual device driver (VxD) that runs under both Windows version 3.x or Windows 95, Sun's development team began by writing a VxD that fully complies with Windows 95 specifications. The obstacle of identificational incompatibility is cured by disguising the Windows 95 compatible VxD as a Windows 3.x compatible driver. This is done by renaming the Windows 95 VxD with the three-character extension "386". The version number within the Device Descriptor Block must also be changed in order to effect a total disguise. A number of third-party software tools are available for this purpose. For example, Vireo Software, Inc. produces a "VtoolsD" product which is marketed as a software tool for building virtual device drivers. This product incudes a "sethdr.exe" program which can be used to modify information in the Device Descriptor Block of a VxD. FIG. 2 depicts the sequence utilized for disguising a Windows 95 compatible VxD as a Windows 3.x compatible VxD.

Once the identificational incompatibility has been cured through the aforementioned steps, Windows 3.x will load the Windows 95 VxD. Loading of the driver, of course, does not insure code compatibility of the Windows 95 VxD with Windows 3.x. Functional compatibility is achieved by additional logic and supplementary Windows 3.x emulation routines to the Windows 95 compatible VxD. The logic works in the following manner: Whenever a Windows 3.x operating system call is made to the VxD, the standard Windows 95 VxD interface is granted control whenever the interface is compatible with Windows 3.x. However, whenever the standard Windows 95 VxD interface is incompatible with or simply non-existent in Windows 3.x, the Windows 3.x VxD interface is emulated by the supplementary routines.

Figure 3:
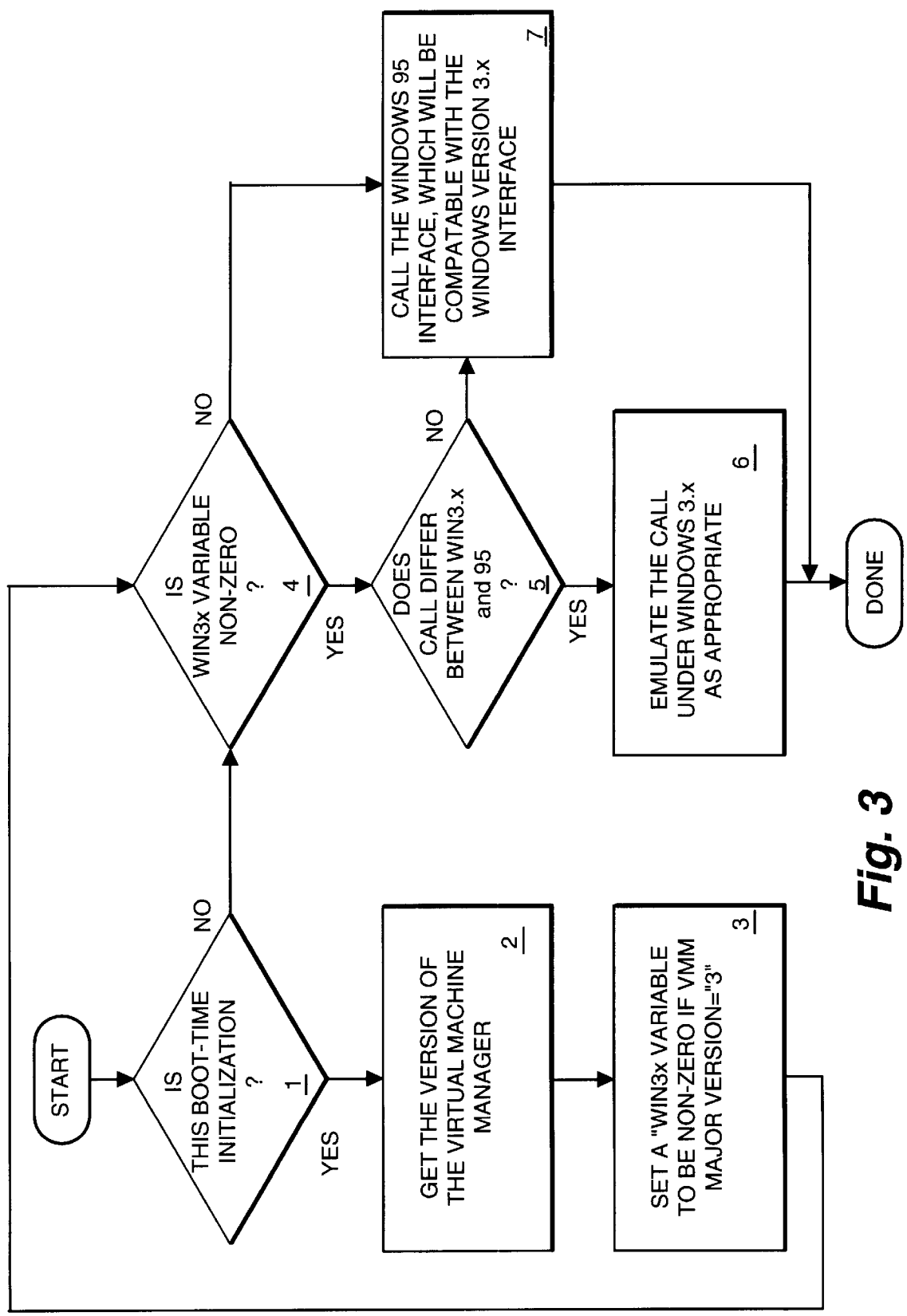
FIG. 3 is a flow chart depicting the logical operation of the cross-platform-compatible virtual device driver.

FIG. 3 provides an operational logic flow diagram for the cross-platform compatible virtual device driver. When the driver is loaded and executed, the operational stepwise flow is as follows:

(1) Is this boot-time initialization?
    Yes: Goto Step 2.
    No: Goto step 4.
(2) Get the version of the Virtual Machine Manager (VMM) to determine which version of Windows is running.
(3) Set a "win3x" variable to be non-zero if the VMM major version is equal to "3".
(4) Is the win3x variable non-zero?
    Yes: Goto step 5.
    No: Goto step 7.
(5) Does this call differ between Windows 3.x and Windows 95?
    No: Goto Step 7.
    Yes: Goto Step 6.
(6) Emulate the Windows 95 call in a manner compatible with Windows 3.x.
(7) Call the Windows 95 interface, which for this call will be compatible with the Windows 3.x interface.

It should be obvious that cross-platform compatibility of virtual device drivers can apply only to the internal coding of the driver, and cannot extend to the identificational aspects of a driver. In other words, the cross-platform-compatible virtual device drivers created in accordance with the present invention must be renamed for use under the various versions of Windows.

Although the invention has been disclosed in the context of a method for building and running a cross-platform-compatible virtual device driver for use in a caching product, the invention is certainly not limited to virtual device drivers used in a caching product. Furthermore, while the invention has been particularly shown and described with reference to a preferred embodiment thereof, it will be understood by those skilled in the art that various other changes in the form and details may be made therein without departing from the spirit and scope of the invention.

What is claimed is:

1. A method, encoded in the form of binary program instructions executable on a data processing system, for implementing a virtual device driver that is compatible at a source code level with both first and second operating systems, said first and second operating systems recognizing first and second sets, respectively, of calls, only a portion of the calls of said second set being fully compatible with said first operating system, said method comprising the steps of:

(a) providing for determining whether or not an instance requiring driver activity is an instance of boot-time initialization, going to step (b) if an instance of boot-time initialization, going to step (d) if not an instance of boot-time initialization;

(b) providing for determining under which operating system the driver is running;

(c) providing for setting a system identifier to a set value if said first operating system is running;

(d) providing for determining whether or not said system identifier equals said set value, going to step (e) if said system identifier equals said set value, going to step (g) if said system identifier does not equal said set value;

(e) providing for determining whether a particular call differs between said first and second operating systems, going to step (f) whenever a call does not differ, going to step (g) whenever a call does differ;

(f) initiating a call that is compatible with both first and second operating systems;

(g) emulating a differing call in a manner that is compatible with said first operating system.

2. A computer program storage medium providing instructions for implementing a virtual device driver that is compatible at a source code level with both first and second operating systems, said first and second operating systems recognizing first and second sets, respectively, of calls, only a portion of the calls of said second set being fully compatible with said first operating system, said instructions being readable and executable by a computer system, said process comprising the steps of:

(a) providing for determining whether or not an instance requiring driver activity is an instance of boot-time initialization, going to step (b) if an instance of boot-time initialization, going to step (d) if not an instance of boot-time initialization;

(b) providing for determining under which operating system the driver is running;

(c) providing for setting a system identifier to a set value if said first operating system is running;

(d) providing for determining whether or not said system identifier equals said set value, going to step (e) if said system identifier equals said set value, going to step (g) if said system identifier does not equal said set value;

(e) providing for determining whether a particular call differs between said first and second operating systems, going to step (f) whenever a call does not differ, going to step (g) whenever a call does differ;

(f) providing for initiating a call that is compatible with both first and second operating systems;

(g) providing for emulating a differing call in a manner that is compatible with said first operating system.

3. A computer implemented process for implementing a virtual device driver that is compatible at a source code level with both first and second operating systems, said first and second operating systems recognizing first and second sets, respectively, of calls, only a portion of the calls of said second set being fully compatible with said first operating system, said process comprising the steps of:

(a) determining whether or not an instance requiring driver activity is an instance of boot-time initialization, going to step (b) if an instance of boot-time initialization, going to step (d) if not an instance of boot-time initialization;

(b) determining under which operating system the driver is running;

(c) setting a system identifier to a set value if said first operating system is running;

(d) determining whether or not said system identifier equals said set value, going to step (e) if said system identifier equals said set value, going to step (g) if said system identifier does not equal said set value;

(e) determining whether a particular call differs between said first and second operating systems, going to step (f) whenever a call does not differ, going to step (g) whenever a call does differ;

(f) initiating a call that is compatible with both first and second operating systems;

(g) emulating a differing call in a manner that is compatible with said first operating system.

* * * * *